United States Patent
Nagasawa

(10) Patent No.: US 7,427,739 B2
(45) Date of Patent: Sep. 23, 2008

(54) ELECTRO-OPTICAL DEVICE AND ELECTRONIC APPARATUS

(75) Inventor: Hitoya Nagasawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 11/672,336

(22) Filed: Feb. 7, 2007

(65) Prior Publication Data

US 2007/0194211 A1    Aug. 23, 2007

(30) Foreign Application Priority Data

Feb. 21, 2006   (JP) ............................. 2006-043476
Nov. 2, 2006    (JP) ............................. 2006-298559

(51) Int. Cl.
    *G06F 3/038* (2006.01)
(52) U.S. Cl. .................. 250/214 R; 345/205; 345/206; 257/59; 257/72
(58) Field of Classification Search .............. 250/208.1, 250/214 R; 348/300, 301, 302; 345/204, 345/205, 206; 257/59, 72
See application file for complete search history.

(56) References Cited

U.S. PATENT DOCUMENTS 5,506,430 A * 4/1996 Ohzu .......................... 257/292
5,959,620 A * 9/1999 Oura et al. ................... 345/204
2002/0054036 A1 * 5/2002 Johnson et al. .............. 345/204
2004/0119075 A1 * 6/2004 Murade ........................ 257/72
2005/0068310 A1 * 3/2005 Ishii ............................ 345/204

FOREIGN PATENT DOCUMENTS

| JP | A 2001-051295 | 2/2001 |
| JP | A 2004-125887 | 4/2004 |
| JP | A 2004-309849 | 11/2004 |

* cited by examiner

*Primary Examiner*—Stephen Yam
(74) *Attorney, Agent, or Firm*—Oliff & Berridge, PLC

(57) ABSTRACT

An electro-optical device includes a substrate, a plurality of scanning lines, a plurality of data lines intersecting with the corresponding plurality of scanning lines in pixel areas on the substrate, a plurality of pixels arranged in the pixel areas so as to correspond to intersections of the plurality of scanning lines and the plurality of data lines, hold capacitors each arranged for a corresponding one of the data lines, and N image signal lines for supplying N image signals which have been subjected to serial-parallel conversion to the plurality of data lines divided into data line groups, each of which has N data lines of the plurality of data lines, where N is a natural number not less than 2. Of the hold capacitors, capacitance values of first hold capacitors arranged for data lines at the ends of each of the data line groups having the N data lines and capacitance values of second hold capacitors arranged for corresponding data lines other than the data lines at the ends of each of the data line groups having N data lines are different from each other.

7 Claims, 7 Drawing Sheets

FIG. 5A  POTENTIALS OF DATA LINES TO WHICH VID2 TO VID11 ARE SUPPLIED
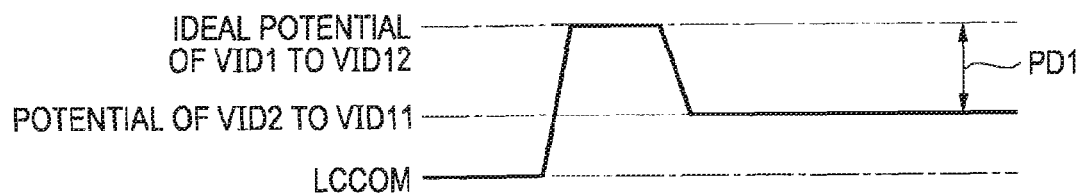
FIG. 5B  POTENTIALS OF DATA LINES TO WHICH VID1 AND VID12 ARE SUPPLIED
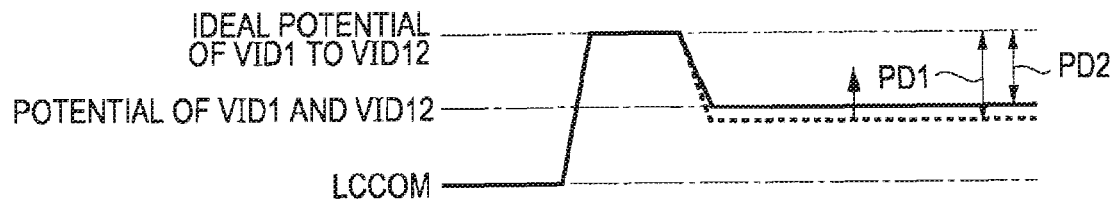
FIG. 6A  POTENTIALS OF DATA LINES TO WHICH VID2 TO VID11 ARE SUPPLIED
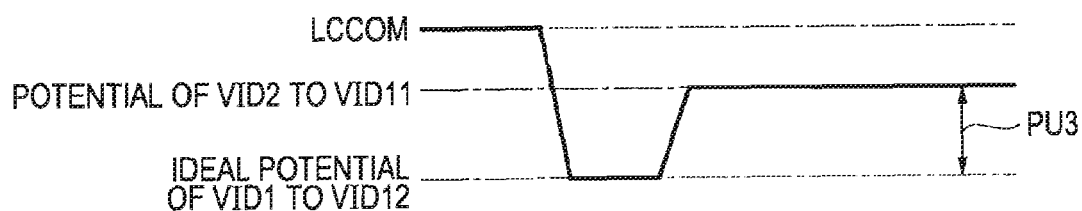
FIG. 6B  POTENTIALS OF DATA LINES TO WHICH VID1 AND VID12 ARE SUPPLIED
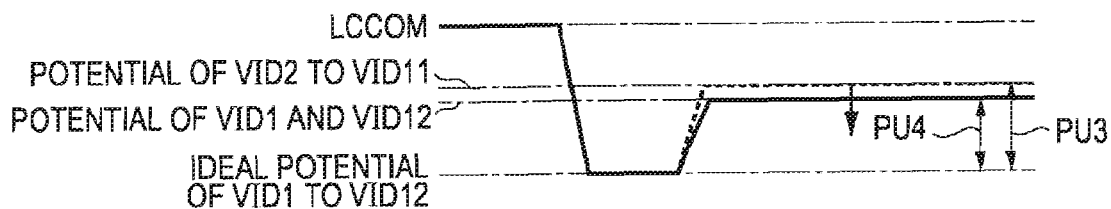

ELECTRO-OPTICAL DEVICE AND ELECTRONIC APPARATUS

BACKGROUND

1. Technical Field

The present invention relates to electro-optical devices such as a liquid crystal device and electronic apparatuses such as a liquid crystal projector including such an electro-optical device.

2. Related Art

In general, such an electro-optical device is driven in accordance with image signals which have been subjected to serial-parallel conversion. In a liquid crystal device, for example, a plurality of data lines arranged in an image display area on a substrate are grouped into blocks, each of which has a predetermined number or data lines. The image signals, which have been subjected to the parallel-serial conversion, are supplied through a sampling switch to the data lines included in the blocks in a block unit. Accordingly, the blocks are driven sequentially on a block-by-block basis, the data lines of each of the blocks being driven simultaneously.

The electro-optical device driven as described above has a technical drawback in that pushdown (that is, a potential drop of an image signal) caused by parasitic capacitance between adjacent data lines leads to generation of uneven luminance at boundaries between adjacent blocks. For example, JP-A-2004-125887 discloses a technique in which capacitors are provided for all data lines as measures for addressing the technical drawback.

However, at a boundary between two blocks (i.e., two data line groups, each of which includes a plurality of data lines) adjacent to each other, in each block, pushdown generated in data lines positioned at the ends of the block and pushdown generated in data lines positioned nearer to the center of the block are relatively different from each other since a timing at which image signals are supplied to the data lines positioned at the ends of the block and a timing at which image signals are supplied to the data lines positioned nearer to the center of the block are different from each other. Specifically, a block adjacent to a block of interest to which image signals are to be supplied has received or has not received image signals before image signals are supplied to the block of interest. That is, a timing at which the data lines included in the adjacent block are charged is different from a timing at which the data lines included in the block of interest to which the image signals are to be supplied are charged. Accordingly, the difference between the timings is one of the reasons an amount of pushdown generated in the data lines positioned at ends of the block of interest to which the image signals are to be supplied and an amount of pushdown generated in the data lines positioned nearer to the center of the block of interest are different from each other, resulting in generation of uneven luminance. In the technique disclosed in JP-A-2004-125887, a capacitor is provided for each of the data lines to suppress pushdown of the data line. However, the technique does not completely realize compensation of the difference between the amount of pushdown in the data lines positioned in the ends of the block and the amount of pushdown in the data lines nearer to the center of the block and reduction of uneven luminance generated on a boundary of two blocks adjacent to each other.

SUMMARY

An advantage of some aspects of the invention is that it provides an electro-optical device capable of displaying a high-quality image in which uneven luminance generated, for example, on portions of the display corresponding to boundaries of adjacent blocks is reduced and an electronic apparatus including such an electro-optical device.

According to an aspect of the invention, there is provided an electro-optical device including a substrate, a plurality of scanning lines, a plurality of data lines intersecting with the corresponding plurality of scanning lines in pixel areas on the substrate, a plurality of pixels arranged in the pixel areas so as to correspond to intersections of the plurality of scanning lines and the plurality of data lines, hold capacitors each arranged for a corresponding one of the data lines, and N image signal lines for supplying N image signals which have been subjected to serial-parallel conversion to the plurality of data lines divided, into data line groups, each of which has N data lines of the plurality of data lines, where N is a natural number not less than 2. Of the hold capacitors, capacitance values of first hold capacitors arranged for data lines at the ends of each of the data line groups having N data lines and capacitance values of second hold capacitors arranged for data lines other than the data lines at the ends of each of the data line groups having N data lines are different from each other.

In accordance with the aspect of the invention, when the electro-optical device is driven, the N Image signals, which have been subjected to serial-parallel conversion, are supplied to the corresponding N image signal lines and further supplied to a sampling circuit, for example. The N image signals are generated by converting serial image signals into a plurality of parallel image signals, such as three-, six-, twelve-, or twenty-four-phase parallel image signals, by means of an external circuit to realize high-resolution image display while rise of driving frequencies is suppressed.

In addition to such supplied image signals, sampling signals are sequentially supplied by, for example, a data line driving circuit to the data line groups on a group-by-group basis through corresponding sampling switches. Then, the sampling circuit sequentially supplies the N image signals for each of the data line groups in accordance with the sampling signals. Accordingly, the data lines which belong to the same data line group are simultaneously driven. Each of the sampling switches is constituted by an N-channel TFT or a P-channel TFT, for example. Each of the sampling switches has the drain connected to a corresponding one of the data lines and is turned on in accordance with the sampling signal supplied to the gate thereof whereby the image signal is supplied to the corresponding one of the data lines.

When the data lines are driven as described above, in pixel portions, the image signals are supplied from the data lines to display elements through pixel switching elements, each of which performs a switching operation, in accordance with scanning signals supplied from a scanning line driving circuit through the scanning lines, for example. Accordingly, liquid crystals serving as the display elements perform image display in accordance with the supplied image signals.

Since the data lines are driven as described above, when an image signal is sampled for a data line positioned nearer to the center of a certain data line group, image signals are sampled for data lines on the immediate right and on the immediate left of the data line of interest. On the other hand, when an image signal is sampled for a data line at one of the ends of the certain data line group, an image signal is sampled for either one of data lines on the immediate right or on the immediate left of the data line of interest.

A potential of a certain data line is influenced by potential shifts generated in data lines adjacent to the certain data line when image signals are sampled for the adjacent data lines due to the parasitic capacitances generated between the certain data line and each of the adjacent data lines. The number of data lines which are adjacent to a data line positioned nearer to the center of the data line group and in which potential shifts are simultaneously generated therein is different from the number of data lines which are adjacent to a data line positioned at the end of the data line group and in which a potential shift is simultaneously generated therein. Accordingly, influence of a potential shift received by a certain data line through a parasitic capacitance is varied in accordance with a position of the data line.

Consequently, a potential shift of a data line positioned at one of the ends of each of data line groups is different from potential shifts of other data lines.

A potential shift of a data line is referred to as a "pushdown" or a "pushup" in this specification.

In accordance with the aspect of the invention, since a parasitic capacitance of a data line positioned at one of the ends of a data line group having at least N data lines and a parasitic capacitance of a data line other than the data lines positioned at the ends of each of the data line groups having N data lines are different from each other, the occurrence of uneven luminance can be reduced.

In a case in which pushdown generated when sampling switches for two corresponding data lines at the ends of each of the data line groups are turned on or off are different from pushdowns generated in the other data lines of the same data line group, since capacitance values of two hold capacitors corresponding to the two data lines are kept different from capacitance values of the other hold capacitors electrically connected to the other data lines included in the same data line group, for example, pushdowns in the all data lines can be made uniform.

In addition, by setting capacitance values of the two data lines positioned at the ends of the data line group so as to be equal to each other, the difference between pushdowns can be reduced regardless of an order in which sampling signals are supplied from the data line driving circuit including a bidirectional shift resistor to the data line groups.

Consequently, generation of uneven luminance recognizable on a display screen due to the difference in parasitic capacitance between adjacent data lines can be prevented. Thus, an electro-optical device can perform high-quality image display.

It is preferable that the capacitance values of the first hold capacitors are relatively smaller than the capacitance values of the second hold capacitors.

The pushdowns generated in the two data lines positioned at the ends of the data line group may be relatively smaller than the pushdowns generated in the other data lines.

Specifically, when a potential of a pixel electrode included in each of the pixel portions, that is, an image signal potential, is higher (i.e., a positive polarity) than a counter electrode potential supplied to a counter electrode which faces the pixel electrode, the pushdowns generated in the two data lines are relatively smaller than the pushdowns generated in the other data lines, and potentials of the two data lines are relatively higher than those of the other data lines. In this case, in pixel portions corresponding to the two data lines, that is, voltages applied to liquid crystal molecules serving as the display elements in the pixel portions at the ends of the data line group are relatively larger than voltages applied to liquid crystal molecules in pixel portions corresponding to the other data lines. Accordingly, each of the pixel portions corresponding to one of the two data lines has light transmittance relatively lower than that of the other pixel portions, resulting in display of a black portion.

In a case where a potential of a pixel electrode included In each of the pixel portions, that is, an image signal potential is smaller (i.e., a negative polarity) than the counter electrode potential supplied to the counter electrode which faces the pixel electrode, the pushdowns generated in the two data lines at the ends of the data line group are relatively smaller than the pushdowns generated in the other data lines. Accordingly, the potentials of the two data lines are relatively lower than those of the other data lines, In this case, in the pixel portions corresponding to the two data lines, that is, voltages applied to the liquid crystal molecules serving as the display elements in the pixel portions at the ends of the data line group are relatively larger than the voltages applied to the liquid crystal molecules in the pixel portions corresponding to the other data lines. Accordingly, each of the pixel portions corresponding to the two data lines has light transmittance relatively higher than that of each of the other pixel portions, resulting in display of a white portion.

Accordingly, since the two capacitance values corresponding to the two data lines positioned at the ends of the data line group are smaller than those corresponding to the other data lines, the pushdowns generated in the two data lines are equal to those generated in the other data lines. Consequently, uneven luminance generated at portions of the display corresponding to the data lines at the ends of the data line group, that is, on boundaries between adjacent data line groups can be reduced. Specifically, when an image is displayed in grayscale in the entirety of an image display area as a test pattern, a display defect, such as display of a black or white portion, in which an image including a portion having luminance different from that of other portions is displayed on portions of the display corresponding to the boundaries of the data line groups can be reduced.

It is preferable that the first hold capacitors include a hold capacitor arranged for a data line at a first end of each of the data line groups and a hold capacitor arranged for a data line at a second end of each of the data line groups. Furthermore, it is preferable that the capacitance value of the hold capacitor arranged for the data line at the first end and the capacitance value of the hold capacitor arranged for the data line at the second end are different from each other.

In this case, on the basis of an order in which the sampling signals are supplied from the sampling circuit after being sampled to the data line groups, the capacitance values of the two hold capacitors can set to be different from each other. Specifically, image signals based on sampling signals supplied before or after image signals are supplied to a certain data line are supplied to two data line groups adjacent to the certain data line group. Accordingly, the two data lines at the ends of the certain data line group generate pushdowns different from each other since potentials of the two data line groups are different from each other. Specifically, the capacitance values of the two hold capacitors are set to be different from each other in accordance with a driving method (a right-shift method or a left-shift method) for an electro-optical device employed on the basis of a method employed for supplying the sampling signals. Examples of the method of supplying the sampling signals include a method for sequentially supplying the image signals to the data line groups in response to the sampling signals sequentially supplied in one direction along an array of the data lines and a method for sequentially supplying the image signals to the data line groups in the other direction. Accordingly, the difference between the pushdowns of the two data lines generated in accordance with the order in which the sampling signals are supplied can be reduced.

It is preferable that the capacitance value of the first hold capacitor is set by controlling at least one of an area in which a pair of conducting layers serving as electrodes of the first hold capacitors and a dielectric layer arranged between the pair of conducting layers are overlapped with each other, a thickness of the dielectric layer, and relative permittivity of the dielectric layer.

In this case, the pair of conductive layers may be extended portions integrally formed with two data lines extending on the substrate. The conductive layers may be formed separately from the two data lines and electrically connected to the two data lines.

The area in which the pair of conductive layers and the dielectric layer interposed between the pair of conductive layers are overlapped with one another may be set so that the difference in pushdown or pushup between the data lines is reduced and so that electrostatic capacitances are set in accordance with wirings formed on the substrate or in accordance with a layout of circuits. The thickness and relative permittivity of the dielectric layer can be similarly set.

The capacitance values of the two hold capacitors can be kept at appropriate values, as described above, and the potential shifts of the data lines are prevented. This further prevents the potential shifts of the pixel electrodes electrically connected to the data lines from being generated. Accordingly, uneven luminance including stripes along portions of the display corresponding to the two data lines at the ends of each of the data line groups can be considerably prevented.

It is preferable that each of the hold capacitors is arranged in a peripheral area of a corresponding one of the pixel areas on the substrate.

In this case, since reduction of the pixel area due to existence of the first and second hold capacitors and other hold capacitors can be prevented, a display performance can be enhanced without increasing the size of the electro-optical device.

According to another aspect of the invention, there is provided an electro-optical device including a substrate; a plurality of scanning lines, a plurality of data lines intersecting with the corresponding plurality of scanning lines in pixel areas on the substrate, a plurality of pixels arranged in the pixel areas so as to correspond to intersections of the plurality of scanning lines and the plurality of data lines, and N image signal lines for supplying N image signals which have been subjected to serial-parallel conversion to the plurality of data lines divided into data line groups, each of which has N data lines of the plurality of data lines, where N is a natural number not less than 2. Parasitic capacitances of data lines at the ends of each of the data line groups having N data lines and parasitic capacitances of data lines other than the data lines at the ends of the data line group having N data lines are different from each other.

In accordance with the aspect of the invention, the occurrence of uneven luminance can be reduced and image quality can be enhanced as described above.

According to a further aspect of the invention, there is provided an electronic apparatus including an electro-optical device described above.

Since the electronic apparatus according to an aspect of the invention Includes the electro-optical device described above, various electronic apparatuses such as a projector display apparatus, a cellular phone, a personal digital assistance, a word processor, a video tape camcorder heaving a viewfinder or a video tape camcorder having a monitor to be directly viewed, a work station, a video phone, a point of sale (POS) terminal, and a touch panel can be realized. In addition, as the electronic apparatus according to an aspect of the invention, an electrophoretic device, such as an electronic paper, can be realized.

Such operations and advantages according to some aspects of the invention will be apparent from the embodiments which will be described hereinafter.

BRIEF DESCRIPTION OF THE DRAWINGS

The invention will be described with reference to the accompanying drawings, wherein like numbers reference like elements.

FIG. 5A is a schematic diagram showing an example of a shift of a potential of image signals in the data lines.

FIG. 5B is a schematic diagram showing an example of a shift of a potential of image signals in the data lines.

FIG. 6A is a schematic diagram showing another example of a shift of a potential of image signals in the data lines.

FIG. 6B is a schematic diagram showing another example of a shift of a potential of image signals in the data lines.

DESCRIPTION OF EXEMPLARY EMBODIMENTS

An electro-optical device and an electronic apparatus including the electro-optical device according to an embodiment will be described hereinafter with reference to the drawings. In this embodiment, a liquid crystal device, which is an electro-optical device, is taken as an example.

Entire Configuration of a Liquid Crystal Device

Figure 1:
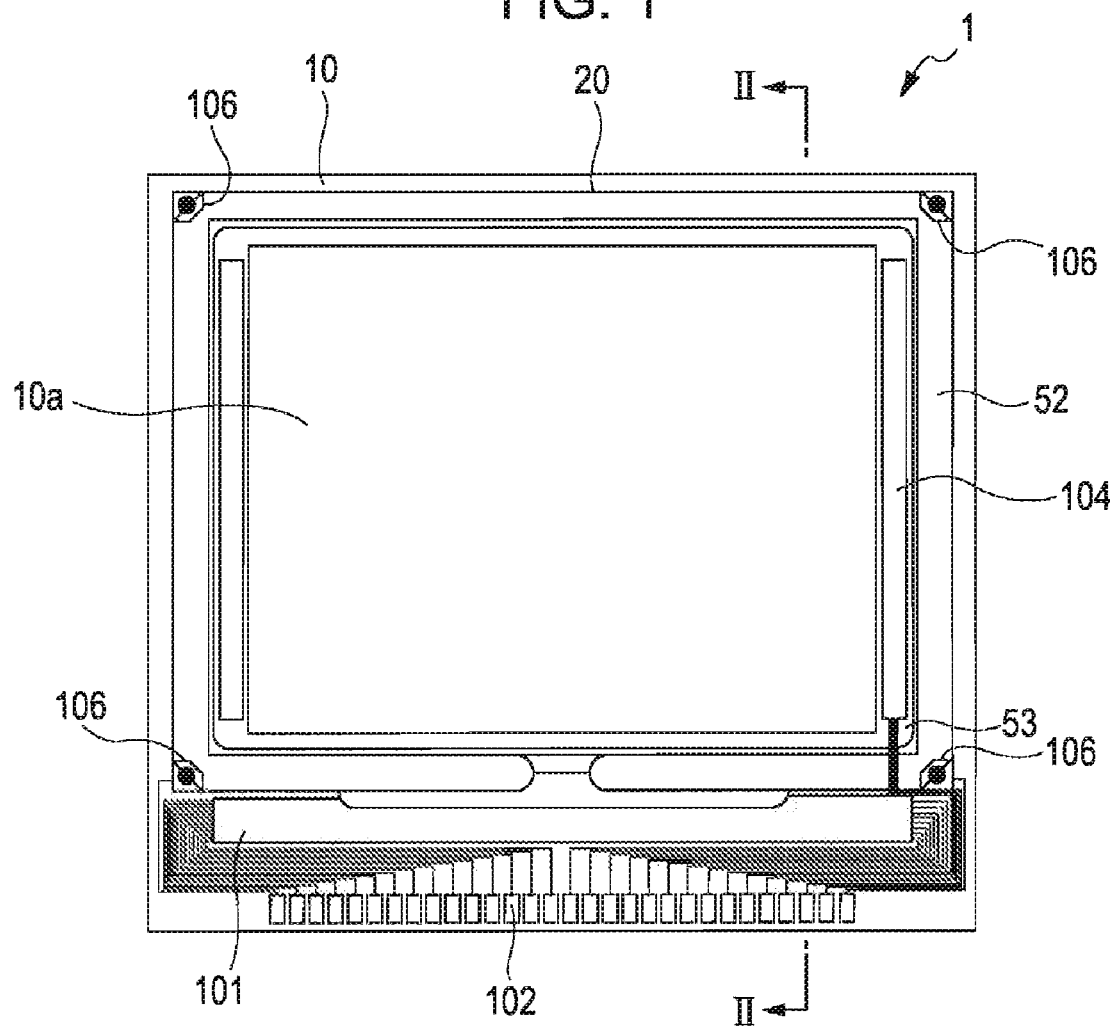
FIG. 1A is a plan view of an electro-optical device according to an embodiment of the present invention.
Figure 2:
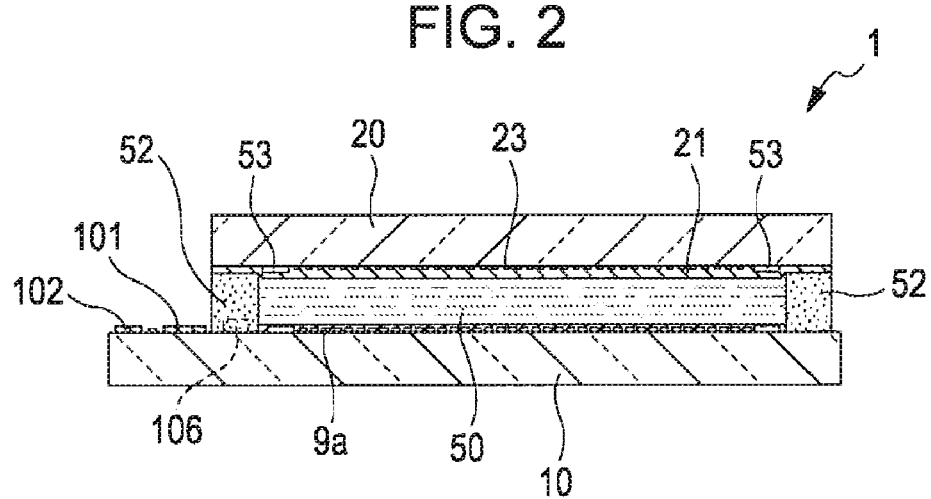
FIG. 2 is a sectional view taken along the line II-II' of FIG. 1.

Referring now to FIGS. 1 and 2, a detailed configuration of a liquid crystal device 1 according to this embodiment will be described FIG. 1 is a schematic plan view of the liquid crystal device 1 including a thin-film transistor (TFT) array substrate 10 and components disposed on the TFT array substrate 10 viewed from a counter substrate 20 side. FIG. 2 shows a sectional view taken along the line II-II' of FIG. 1.

In FIGS. 1 and 2, the liquid crystal device 1 includes the TFT array substrate 10 and the counter substrate 20 disposed so as to face the TFT array substrate 10. A liquid crystal layer 50 is enclosed between the TFT array substrate 10 and the counter substrate 20. The TFT array substrate 10 and the counter substrate 20 are adhered to each other by a seal 52 disposed in a sealing area positioned around an image display area 10a.

The seal 52 used for adhering the two substrates to each other is made of, for example, an ultraviolet curable resin or thermally curable resin. In a fabricating process, the seal 52 is applied to the TFT array substrate 10 and then exposed to ultraviolet radiation or heated to be cured. The seal 52 includes glass fibers or gap members such as glass beads dispersed therein to keep a predetermined gap between the TFT array substrate 10 and the counter substrate 20 (a gap between the substrates).

A frame-shaped light-shielding layer 53 for defining a frame area of the image display area 10a is arranged on the counter substrate 20 and in parallel to the inner periphery of the sealing area on which the seal 52 is disposed. Part of or the entirety of the frame-shaped light-shielding layer 53 may be arranged on the TFT array substrate 10 as an incorporated light-shielding layer.

In an area, which is positioned outside of the sealing area on which the seal 52 is disposed, of an area surrounding the image display area 10a, a data line driving circuit 101 and an external, circuit connection terminal 102 are disposed along a first side of the TFT array substrate 10. The scanning line driving circuit 104 is disposed along one of two sides adjacent to the first side so as to be covered by the frame-shaped light-shielding layer 53. Two of the scanning line driving circuits 104 may be disposed along the two sides adjacent to the first side of the TFT array substrate 10 on which the data line driving circuit 101 and the external circuit connection terminal 102 are disposed. In this case, the two scanning line driving circuits 104 are electrically connected to each other by a plurality of wiring disposed along another side of the TFT array substrate 10. In the area surrounding the image display area 10a, a plurality of capacitors (retention capacitors), which are electrically connected to corresponding data lines, are arranged, which will be described later.

Substrate conduction members 106 serving as substrate conduction terminals used for connecting the TFT array substrate 10 and the counter substrate 20 are disposed at the four corners of the counter substrate 20. Substrate conduction terminals are also disposed in areas of the TFT array substrate 10 corresponding to the four corners of the counter substrate 20. Thus, the TFT array substrate 10 and the counter substrate 20 are electrically connected to each other by the substrate conduction terminals and the substrate conduction members 106.

In FIG. 2, on the TFT array substrate 10, a pixel electrode 9a having TFTs and wirings such as scanning lines and data lines arranged thereon is disposed for pixel switching. In addition, an alignment layer is disposed on the pixel electrode 9a. On the counter substrate 20, a counter electrode 21, and a lattice or stripe-shaped light-shielding layer 23 are disposed, and an alignment layer is further disposed as the uppermost layer. The liquid crystal layer 50 is constituted by one type of nematic liquid crystal or by a mixture of different types of nematic liquid crystals. The liquid crystals are in a predetermined oriented state between a pair of the alignment layers. Note that the liquid crystal device 1 may include a precharge circuit in addition to a sampling circuit.

Electrical Configuration of Liquid Crystal Device

Figure 3:
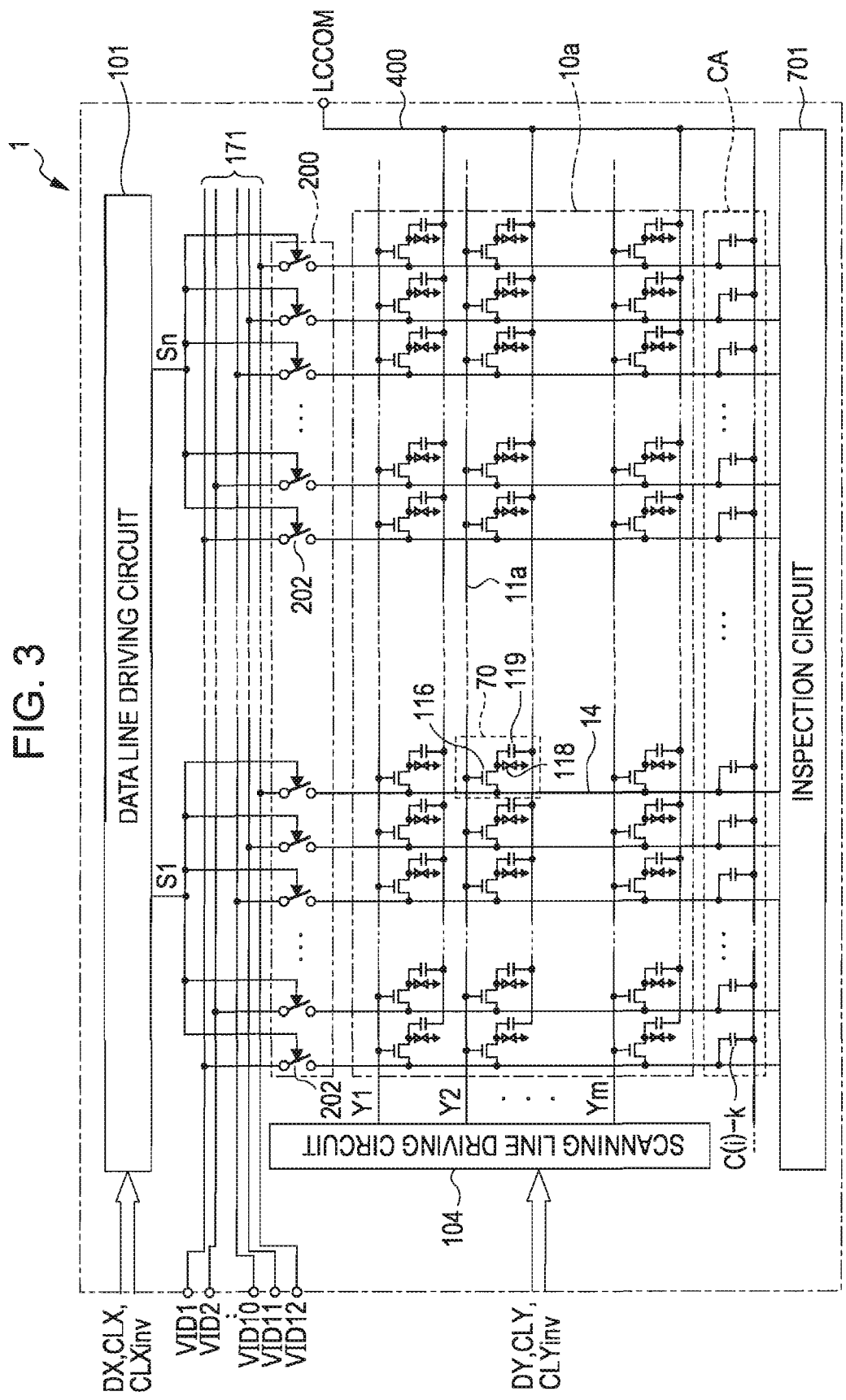
FIG. 3 is a block diagram showing a configuration of a primary electrical connection of the electro-optical device according to the embodiment.

Referring to FIG. 3, a configuration of electrical connections of the liquid crystal device 1 will now be described. FIG. 3 is a block diagram showing a configuration of primary electrical connections of the liquid crystal device 1.

As shown in FIG. 3, the liquid crystal device 1 includes the scanning line driving circuit 104, the data line driving circuit 101, a sampling circuit 200, an inspection circuit 701, image signal lines 171, and a capacitor section CA in a peripheral area of the TFT array substrate 10.

When receiving a Y start pulse DY, the scanning line driving circuit 104 successively generates and outputs scanning signals Y1 to Ym at certain timings on the basis of a Y clock signal CLY and an inverted Y clock signal CLYinv. When receiving an X start pulse DX, the data line driving circuit 101 successively generates and outputs sampling signals S1, S2, . . . , and Sn at certain timings on the basis of an X clock signal CLX and an inverted X clock signal XCLXinv. Each of the scanning line driving circuit 104 and the data line driving circuit 101 has a signal processor such as a shift resistor including a plurality of TFTs arranged In the area surrounding the image display area 10a on the TFT array substrate 10.

The sampling circuit 200 includes a plurality of sampling switches 202 provided for corresponding data lines 14. Each of the sampling switches 202 is formed of two TFTs electrically connected in series to each other and each of the TFTs is a P-channel TFT or an N-channel TFT.

The liquid crystal device 1 includes the data lines 14 arranged vertically, scanning lines 11a arranged horizontally, and capacitance lines 400 in the image display area 10a, which occupies a center area of the TFT array substrate 10. Pixel portions 70 are arranged in a matrix at positions corresponding to intersections of the data lines 14 and the scanning lines 11a. Each of the pixel portions 70 includes a liquid crystal element 118, the pixel electrode 9a, a TFT 116 for switch control of the pixel electrode 9a, and a hold capacitor 119. The capacitance lines 400 are electrically connected to a constant-potential source, not shown. A potential of a power source supplied to the capacitance lines 400 is the same as a counter electrode potential LCCOM supplied to the counter electrode 21 arranged to face the pixel electrode 9a. A first electrode of the hold capacitor 119 is electrically connected to a corresponding one of the capacitance lines 400. A potential of the first electrode is kept at the counter electrode potential LCCOM when the liquid crystal device 1 is driven. The hold capacitor 119 is arranged in parallel to the liquid crystal element 118. A voltage of the pixel electrode 9a is kept by the hold capacitor 119, for example, for a period of time three orders of magnitude larger than a period of time for which a source voltage is applied. Accordingly, a retention characteristic is improved and a high contrast ratio can be achieved.

The image signal lines 171 are electrically connected to corresponding data lines through the sampling circuit 200. N image signals obtained from pieces of input image data VID, which has been supplied from an external circuit and subjected to serial-parallel conversion, are supplied to corresponding image signal lines 171 through the sampling switches 202, which selectively switch on or off in accordance with sampling signals Si. The N image signals are generated by performing serial-parallel conversion on the single piece of input image data by means of, for example, a signal converter such as an image signal supply circuit, not shown.

In this embodiment, twelve image signals VID1 to VID12, that is twelve image signal phases (N=12), are generated and twelve image signal lines 171 are arranged so as to correspond to the twelve image signal phases. In the image signal supply circuit, not shown, the polarity of the voltage of each of the image signals VID1 to VID12 may be inverted to positive or negative with respect to the counter electrode potential LCCOM used as a reference potential, whereby the polarity-inverted image signals VID1 to VID12 may be output.

The inspection circuit 701 is electrically connected to the data lines 14 and supplies inspection signals to the pixel portions 70.

The capacitor section CA includes a plurality of capacitors C(i)–k (i=1, 2, . . . , and n, where n is a natural number not smaller than two, and k=1, 2, . . . , and N). The plurality of capacitors C(i)–k are electrically connected to the capacitance lines 400 and the corresponding data lines 14. When each of the sampling switches 202 is turned on, the corresponding capacitor C(i)–k considerably or totally prevents a potential of the image signal supplied to the data line 14 from becoming smaller (i.e., a pushdown) than a potential of the image signal that should be obtained.

Principle of Operation of Liquid Crystal Device

A principle of an operation of the liquid crystal device 1 will now be described with reference to FIG. 3. The liquid crystal device 1 is driven by a 1H inversion driving method, which is an example of a line inversion method.

As shown in FIG. 3, each of the TFTs 116 is arranged for applying an image signal supplied from the data line 14 to a selected pixel. The gate of the TFT 116 is electrically connected to the corresponding scanning line 11a and the source of the TFT 116 is electrically connected to the corresponding data line 14. The drain of the TFT 116 is connected to the pixel electrode 9a. The pixel electrode 9a retains liquid crystal capacitance generated between the pixel electrode 9a and the counter electrode 21, which will be described later, for a predetermined period of time in accordance with the image signal. A second electrode of the hold capacitor 119 is electrically connected to the drain of the TFT 116 in parallel to the pixel electrode 9a. The first electrode of the hold capacitor 119 is connected to the capacitance lines 400 to which counter electrode potential LCCOM is supplied and is kept at a constant potential.

The liquid crystal device 1 is driven by, for example, a TFT active matrix driving method. In the liquid crystal device 1, the scanning line driving circuit 104 sequentially applies scanning signals Y1, Y2, . . . , and Ym to the scanning lines 11a. The data line driving circuit 101 applies image signals to the data lines 14 in a row of selected pixel areas arranged in a horizontal direction in which the TFTs 116 are turned on. The image signals may be sequentially supplied to the data lines 14. Accordingly, the image signal is supplied to the pixel electrode 9a in the selected pixel area. In the liquid crystal device 1, the TFT array substrate 10 and the counter substrate 20 are arranged to face each other through the liquid crystal layer 50 (refer to FIG. 2). Since an electric field is applied to the liquid crystal layer 50 for each pixel area disposed in such an arrangement of blocks, an amount of transmitted light between the TFT array substrate 10 and the counter substrate 20 is controlled for each pixel area and an image having gradation is displayed. The hold capacitor 114 prevents the image signal retained in each of the pixel areas from leaking.

The twelve image signals VID1 to VID12 which have been subjected to serial-parallel conversion are supplied to the pixel portions 70 through the N image signal lines 171, that is twelve image signal lines 171 in this embodiment. The data lines 14 are sequentially driven for each data line group having 12 data lines 14 corresponding to the number of image signal lines 171, as will be described later.

The data line driving circuit 101 supplies sampling signals Si (i=1, 2, . . . , and n) to the data lines 14 in the data line groups on a group-by-group basis through the corresponding sampling switches 202. The sampling switches 202 are selectively turned on in response to the sampling signals Si.

Accordingly, the image signals VID1 to VID 12 are supplied sequentially to the data line groups on a group-by-group basis and supplied simultaneously to the data lines 14 of each of the data line groups from the twelve image signal lines 171 through the sampling switches 202 which are turned on. Thus, according to the liquid crystal device 1 of this embodiment, driving frequency can be controlled, since the data lines 14 are driven for each data line group.

A voltage determined on the basis of the potential of the pixel electrode 9a and the counter electrode 21 is applied to the liquid crystal element 118. An orientation and an order of molecular assembly of a liquid crystal are changed in accordance with an applied voltage level so that the liquid crystal modulates light and performs gradation display. In a normally white mode, transmittance of incident light is reduced in accordance with the voltage applied in a pixel unit, whereas in a normally black mode, transmittance of incident light is increased in accordance with the voltage applied in a pixel unit. Consequently, light having contrast according to the image signals VID1 to VID12 is emitted from the liquid crystal device 1 as a whole and an image is displayed.

Since the 1H inversion driving method is employed in this embodiment, in a period of time during which an image of an m-th field or an m-th frame is displayed (where m is a natural number), each of rows of the pixel electrodes 9a arranged in parallel to one another in the Y-axis direction (in a direction in which the data lines 14 extend in FIG. 3) receives a voltage having a polarity different from that of adjacent rows. Each of the pixel areas is driven while a liquid crystal driving voltage having a polarity different from that of adjacent rows is applied. Specifically, in an image display period of a (m+1)-th field following the m-th field or a (m+1)-th frame following the m-th frame, the polarity of the liquid crystal driving voltage is reversed. This is periodically repeated from the (m+2)-th field or (m+2)-th frame onward. As described above, the polarity of the voltage applied to the liquid crystal layer 50 is periodically reversed thereby preventing a direct current from being applied to the liquid crystal and preventing the liquid crystal from being deteriorated. In addition, since the polarity of the applied voltage is different between the adjacent rows of the pixel electrodes 9a, crosstalk and flicker can be reduced. A potential of the electrode, which is one of a pair of electrodes constituting the hold capacitor 119 and which is electrically connected to the corresponding capacitance line 400 (that is, the first electrode described above), is constant since the potential is kept at the counter electrode potential LCCOM. However, an electrode, which is not electrically connected to the capacitance line 400 (that is, a second electrode), has a potential having a polarity which is periodically reversed in accordance with the applied voltage for the counter electrode potential LCCOM which is a constant potential, that is, in accordance with the polarity of an image signal potential.

In this embodiment, the 1H inversion driving method employed as an example of a driving method for the liquid crystal device 1. However, it is obvious that a 1S inversion driving method in which voltages having different polarities are applied to adjacent rows, or a dot inversion driving method in which voltages having different polarities are applied to adjacent pixels may be employed as the driving method.

Figure 4:
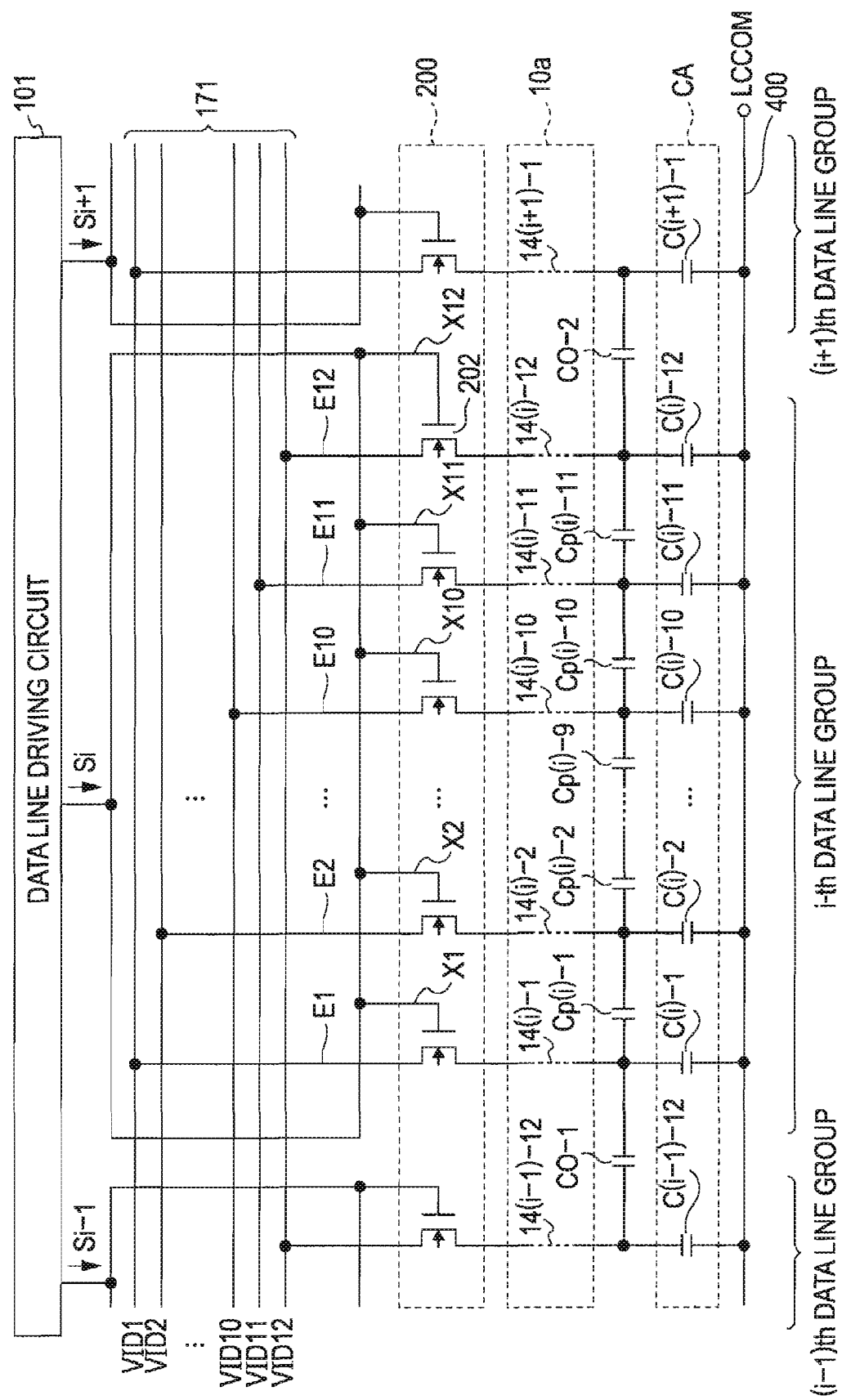
FIG. 4 is a diagram showing a circuit configuration for driving data lines.

Referring to FIGS. 4 to 6, a primary configuration for driving the data lines 14 will next be described. FIG. 4 is a diagram showing a circuit configuration for driving the data lines 14. FIGS. 5 and 6 are graphs schematically illustrating shifts of image signal potentials of the data lines 14 in a data line group.

A case where data line groups are driven sequentially on a group-by-group basis in one direction along an array of m data lines 14 is taken as an example. Specifically, of three data line groups driven in accordance with three sampling signals Si−1, Si, and Si+1, which are the (i−1)th, i-th, and (i+1)th signals, respectively, supplied from the data line driving circuit 101, a configuration of an i-th data line group which is driven in accordance with an i-th sampling signal Si is particularly focused on for description hereinafter.

In FIG. 4, the liquid crystal device 1 includes the i-th data line group having 12 data lines and a capacitor section CA.

Data lines 14(i)-k (where k=1, 2, ..., or 12) included in the i-th data line group are supplied with the image signals VID1 to VID12 through the sampling switches 202 and branch lines E1 to E12, respectively. Each of the branch lines E1 to E12 has one end electrically connected to a corresponding one of the image signal lines 171. Each of the branch lines E1 to E12 has the other end electrically connected to a corresponding one of the data lines 14(i)-k (where k=1, 2, ..., or 12) through a corresponding one of the sampling switches 202. Each of the sampling switches 202 is constituted by, for example, a TFT and has the source electrically connected to the corresponding one of the branch lines Ek (k=1, 2, ..., and 12) and the drain electrically connected to the corresponding one of the data lines 14(i)-k. The gates of the sampling switches 202 are electrically connected to the data line driving circuit 101 through corresponding control lines X1 to X12. The i-th sampling signals Si are supplied from the data line driving circuit 101 to the control lines X1 to X12 at the same time.

The capacitor section CA includes capacitors C(i)-k provided for the corresponding data lines 14(i)-k. The capacitors C(i)-k are electrically connected between the data lines 14(i)-k and the capacitance lines 400. The capacitors C(i)-k considerably or totally prevent potential shifts of the corresponding data lines 14(i)-k through the parasitic capacitances Cp(i)-j, CO-1, and CO-2, which will be described later, from occurring before or when image signals VIDk are supplied to the data lines 14(i)-k.

The parasitic capacitances Cp(i)-j (where j=1, 2, ..., and 11) are arranged between adjacent data lines 14(i)-k. Specifically, in the i-th data line group, a parasitic capacitance Cp(i)-10 is arranged between a data line 14(i)-11 and a data line 14(i)-10 adjacent to the data line 14(i)-11, and a parasitic capacitance Cp(i)-11 is arranged between the data line 14(i)-11 and a data line 14(i)-12 also adjacent to the data line 14(i)-11.

The i-th data line group includes a data line 14(i)-1 and the data line 14(i)-12 at the ends thereof along the array of the data lines of the i-th data line group. The (i-1)th data line group, to which image signals are supplied in accordance with a (i-1)th sampling signal Si-1, includes a data line 14(i-1)-12. The (i+1)th data line group, to which image signals are supplied in accordance with a (i+1)th sampling signal Si+1, includes a data line 14(i+1)-1. A parasitic capacitance CO-1 is arranged between the data line 14(i)-1 and the data line 14(i-1)-12. A parasitic capacitance CO-2 is arranged between the data line 14(i)-12 and the data line 14(i+1)-1.

In this embodiment, the image signals VID1 to VID12 are collectively supplied to the (i-1)th data line group and the (i+1)th data line group before or after the image signals VID1 to VID12 are supplied to the i-th data line group.

In a case where the image signals VID1 to VID12 are supplied to the i-th data line group and where, of the data lines included in the i-th data line group, one of data lines except for the data lines at the ends of the i-th data line group, for example, a data line 14(i)-2, receives an image signal, image signals are also supplied to a data line 14(i)-1 on the immediate left of the data line 14(i)-2 and a data line 14(i)-3 on the immediate right of the data line 14(i)-2. Accordingly, when a potential of the data line 14(i)-2 is changed by the image signal supplied to the data line 14(i)-2, potentials of the data lines adjacent to the 14(i)-2 are also changed.

On the other hand, when an image signal is supplied to, for example, the data line 14(i)-1 at one of the ends of the i-th data line group, an image signal has already been supplied to the data line 14(i-1)-12 on the immediate left of the data line 14(i)-1. Accordingly, when a potential of the data line 14(i)-1 is changed by supplying an image signal to the data line 14(i)-1, a potential of the data line on the immediate left is not changed but a potential, of the data line on the immediate right is changed.

Consequently, the data lines at the ends of the data line group and the other data lines are influenced to different degrees by potential shifts of adjacent data lines through parasitic capacitances. Accordingly, pushdowns of the data lines at the ends of the data line group are different from those of the other data lines.

Specifically, when receiving an image signal, the data line 14(i)-2 is influenced by potential shifts of the data lines 14(i)-1 and 14(i)-3 through the parasitic capacitances Cp(i)-1 and Cp(i)-2, respectively. That is, the data line 14(i)-2 is influenced by the adjacent data lines Similarly, each of the data lines 14(i)-3 to 14(i)-11 is influence by it adjacent data lines When receiving an image signal, the data line 14(i)-1 is influenced by a potential shift of the data line 14(i)-2 through the parasitic capacitance Cp(i)-1 However, since a potential of the data line 14(i-1)-12 is not changed, the data line 14(i)-1 is not influenced by the parasitic capacitance CO-1 That is, the data line 14(i)-1 is only influenced by the data line on one side thereof. This is also true for the data line 14(i)-12.

Consequently, pushdowns generated in the data lines 14(i)-1 and 14(i)-12 are different from pushdowns generated in the data lines 14(i)-2 to 14(i)-11. This causes an abnormal display including stripes along portions of the display corresponding to the data lines at the ends of the i-th data line group.

Examples of the abnormal display are display of black stripes, which are relatively dark portions, along portions of the display corresponding to data lines, and display of white stripes instead of the black stripes, which are relatively brighter portions along portions of the display corresponding to data lines showing when an image is displayed in grayscale as a test pattern on the liquid crystal device 1.

Referring to FIGS. 5 and 6, pushdowns generated in the data lines included in the i-th data line group will now be described in detail.

FIGS. 5A and 5B are diagrams schematically showing potentials of the data lines to which the image signals VID1 to VID12 having the positive polarities with respect to the counter electrode potential LCCOM are supplied. FIGS. 6A and 6B are diagrams schematically showing potentials of the data lines to which the image signals VID1 to VID12 having the negative polarities with respect to the counter electrode potential LCCOM are supplied.

As shown in FIG. 5A, potentials of the image signals VID2 to VID11, which have been actually supplied to the data lines 14(i)-2 to 14(i)-11 are lower by a pushdown PD1 generated in each of the data lines 14(i)-2 to 14(i)-11 due to the parasitic capacitances than potentials, which should be obtained using the counter electrode potential LCCOM as a reference potential, of the image signals VID1 to VID12 intended to be supplied to the data lines 14(i)-1 to 14(i)-12.

As shown in FIG. 5B, pushdowns PD2 which are relatively smaller than the pushdowns PD1 generated in the data lines 14(i)-2 to 14(i)-11 are generated in the data lines 14(i)-1 and 14(i)-12.

The potential differences shown in FIGS. 5A and 5B cause a problem in that, in the normally white mode, dark stripes are displayed along portions of the display corresponding to the data lines 14(i)-1 and 14(i)-12 positioned at the ends of the i-th data line group.

As shown in FIG. 6A, potentials of the image signals VID2 to VID11, which have been actually supplied to the data lines 14(i)-2 to 14(i)-11, are higher by a pushup PU3 generated in each of the data lines 14(i)-2 to 14(i)-11 than potentials, which should be obtained using the counter electrode potential LCCOM as a reference potential, of the image signals VID1 to VID12 intended to be supplied to the data lines 14(i)-1 to 14(i)-12.

As shown in FIG. 6B, a pushup PD4, which is relatively smaller than the pushup PD3 generated in each of the data lines 14(i)-2 to 14(i)-11, is generated in each of the data lines 14(i)-1 and 14(i)-12.

Accordingly, the potential differences shown in FIGS. 6A and 6B cause a problem in that dark stripes are displayed along portions of the display corresponding to the data lines 14(i)-1 and 14(i)-12 positioned at the ends of the i-th data line group.

To address this problem, the liquid crystal device 1 of this embodiment can considerably or totally prevent a pushdown (or a pushup) generated when the image signal VIDk is supplied to the data line 14(i)-k. In addition, even if the liquid crystal device 1 cannot eliminate generation of a pushdown, the liquid crystal device 1 of this embodiment can reduce a difference between a pushdown generated in each of the data lines 14(i)-1 and 14(i)-12 at the ends of the data line group and a pushdown generated in each of the data lines 14(i)-2 to 14(i)-11 to the extent that an image can be displayed with no problems.

Specifically, each of the capacitor C(i)-1 and the capacitor (i)-12, each of which is an example of a "first hold capacitor" in the invention, has an electrostatic capacitance different from that of each of the capacitors C(i)-2 to C(i)-11, each of which is an example of a "second hold capacitor" in the invention. In other words, the electrostatic capacitance of each of the capacitors (i)-1 and C(i)-12 is set to be different from that of each of the capacitors C(i)-2 to C(i)-11 so that the different degrees to which the data lines are influenced by a potential shift through the parasitic capacitances Cp(i)-1 to Cp(i)-11 and a potential shift through the parasitic capacitances CO-4 and CO-2 are cancelled out. For example, the electrostatic capacitances of the capacitor C(i)-1 and the capacitor C(i)-12 are set to be relatively smaller than those of the capacitors C(i)-2 to C(i)-11.

The electrostatic capacitances of the capacitors C(i)-2 to C(i)-11 electrically connected to the data lines 14(i)-2 to 14(i)-11, respectively, which are positioned around the center of the i-th data line group, are set to be different from the electrostatic capacitances of the capacitors C(i)-1 and C(i)-12 corresponding to the data lines 14(i)-1 and 14(i)-12, respectively, which are positioned at the ends of the i-th data line group. This considerably or totally prevents a difference in pushdown being generated between the plurality of data lines and furthermore, a display defect such as generation of black stripes or white stripes on boundaries of portions of the display corresponding to the adjacent data lines can be suppressed.

The electrostatic capacitances of the capacitors C(i)-1 and C(i)-12 should be set on the basis of results of an experiment, a theory, or a simulation so that uneven luminance including the black stripes or the white stripes is not generated or display quality is not substantially deteriorated.

When the pushdowns of the image signal potentials of the image signals VID1 and VID12 in the data lines 14(i)-1 and 14(i)-12, respectively, are smaller than pushdowns of the image signal potentials of the image signals supplied to the other data lines, the electrostatic capacitances of the capacitors C(i)-1 and C(i)-12 should be set relatively smaller than the electrostatic capacitances of other capacitors so that a difference between the pushdowns can be cancelled out. For example, the electrostatic capacitances of the capacitors C(i)-2 to C(i)-11 are set to approximately 2 pF to 3 pF, and the electrostatic capacitances of the capacitors C(i)-1 and C(i)-12 are set to be smaller than the electrostatic capacitances of the capacitors C(i)-2 to C(i)-11 by approximately 0.1 pF for a 1 V difference in pushdown.

The electrostatic capacitances of the capacitor C(i)-1 and C(i)-12 may be set to be equal to each other or set to be different from each other on the basis of a driving method of the liquid crystal device 1. For example, when the capacitances of the capacitor C(i)-1 and C(i)-12 are set to be equal to each other, the difference between pushdowns can be reduced regardless of an order in which sampling signals supplied from the data line driving circuit 101 including a bidirectional shift resistor are supplied to the data line groups.

As with the driving method employed in the liquid crystal device 1 of this embodiment, in a case where the image signals are sequentially supplied to the data line groups in one direction (a so-called right-shift method or a left-shift method), since the electrostatic capacitances of the capacitors C(i)-1 and C(i)-12 are set to be different from each other in accordance with a direction in which the image signals are supplied, even if pushdowns generated in the data lines at the ends of each of the data line groups are different from each other, these pushdowns and pushdowns generated in the other data lines can be made uniform. Accordingly, a display defect such as uneven luminance caused by stripes generated at portions of the display corresponding to the data lines at the ends of the data line group can be considerably or totally prevented in an effective manner.

Consequently, according to the liquid crystal device of this embodiment, generation of the uneven luminance such as black stripes or white stripes, which is recognized on a display screen due to the difference of influences of potential shifts through the parasitic capacitances between adjacent data lines, can be considerably or totally prevented. Thus, an electro-optical device, such as a, liquid crystal device, can display a high-quality image.

Detailed Configuration of Capacitors

Figure 7:
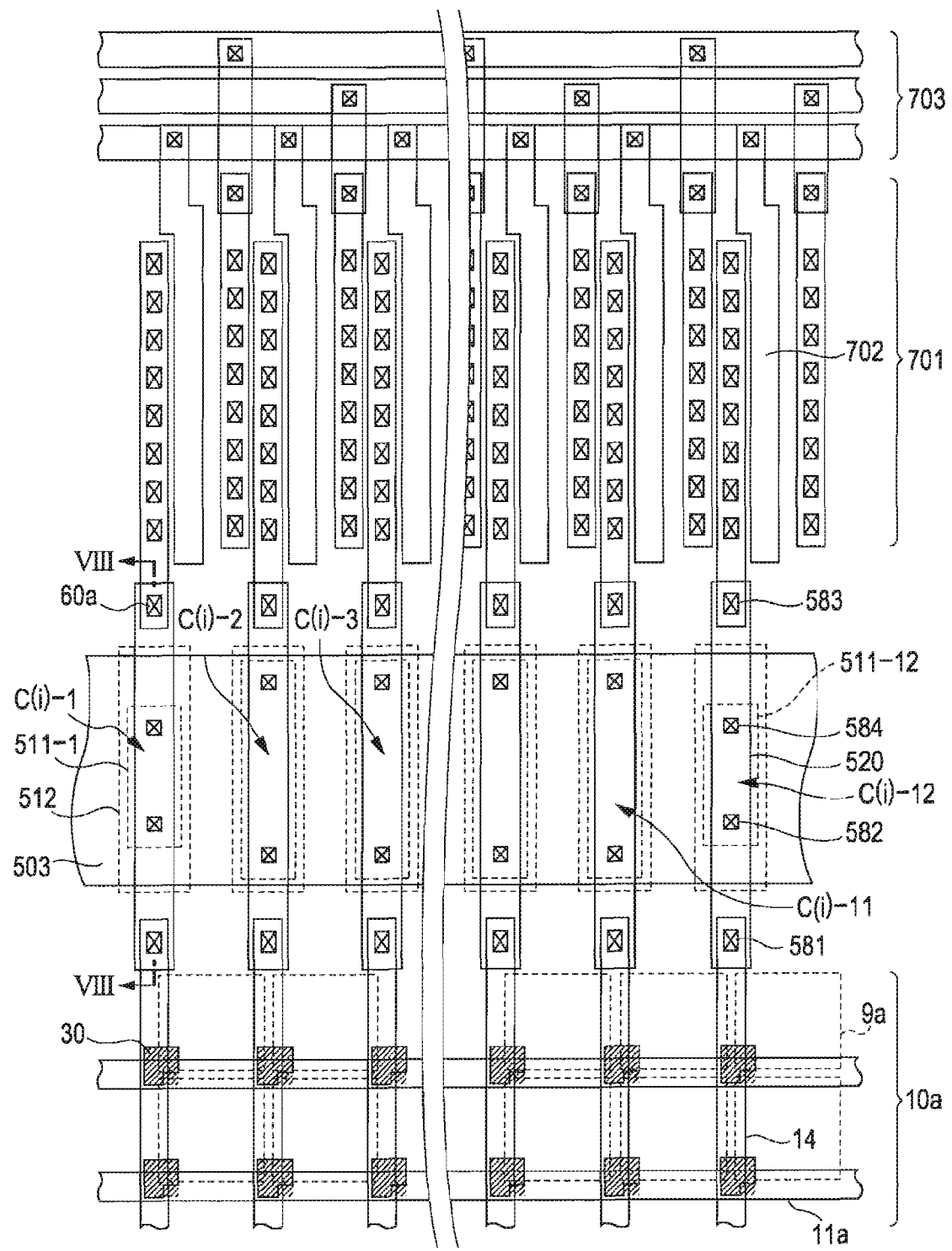
FIG. 7 is a plan view of capacitors electrically connected to data lines.
Figure 8:
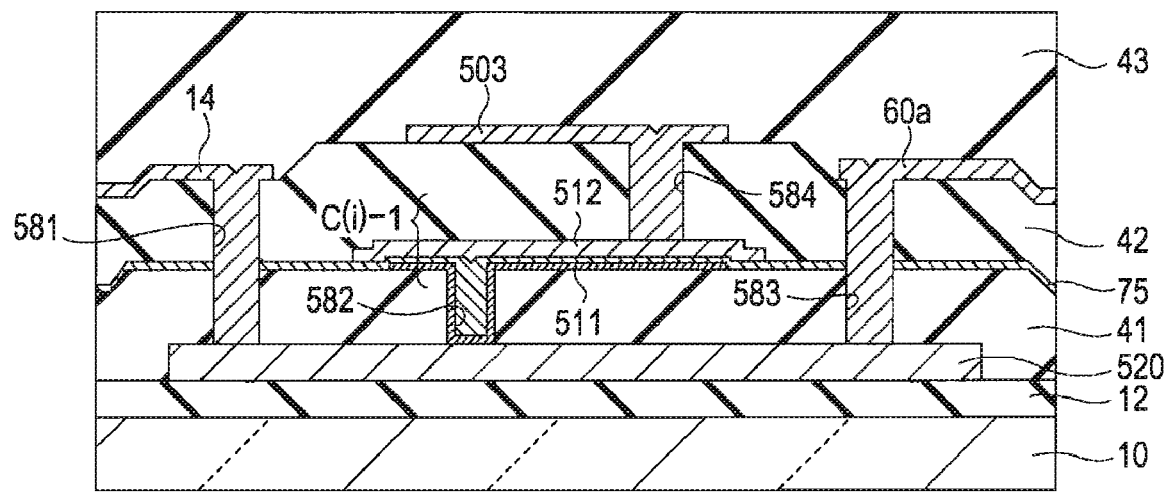
FIG. 8 is a sectional view taken along the line VIII-VIII' of FIG. 7.

Referring to FIGS. 7 and 8, the capacitors electrically connected to the data lines are described in detail. FIG. 7 is a plan view snowing the capacitors electrically connected to the data lines. FIG. 8 is a sectional view taken along the line VIII-VIII' of FIG. 7. Note that FIG. 4 illustrates a plan configuration of the i-th data line group in detail.

As shown in FIG. 7, the capacitors C(i)-k (k=1, 2, ..., and 12) are arranged in the area surrounding the image display area 10a on the TFT array substrate 10. The lower sides of the data lines 14 in FIG. 4 are connected to the inspection circuit 701 (not shown in FIG. 4, refer to FIG. 3).

Each of the capacitors C(i)-k has one end as a first conducting layer 511 electrically connected to the corresponding one of data lines 14. Each of the capacitors C(i)-k has the other end as a second conducting layer 512 electrically connected to a capacitor electrode line 503 which extends so as to intersect the data lines 14 and has a potential kept at the counter electrode potential LCCOM. A dielectric layer 75 shown in FIG. 8 is sandwiched between the first conducting layer 511 and the second conducting layer 512.

In this embodiment, the first conducting layer 511-1 of the capacitor C(i)-1 and the first conducting layer 511-12 of the capacitor C(i)-12 are smaller in area than the other first conducting layers 511-2 to 511-11. An area in which the first conducting layer 511-1 is overlapped with the second conducting layer 512 and the dielectric layer 75 and an area in which the first conducting layer 511-12 is overlapped with the second conducting layer 512 and the dielectric layer 75 are smaller than areas in which each of the other first conducting layers 511-2 to 511-11 is overlapped with the second conducting layer 512 and the dielectric layer 75. Accordingly, the electrostatic capacitances of the capacitors C(i)-1 and C(i)-12 are set to be relatively smaller than the electrostatic capacitances of the other capacitors C(i)-2 to C(i)-11.

As shown in FIGS. 7 and 8, the first conducting layer 511 is formed on a first interlayer insulating film 41. The first conducting layer 511 is electrically connected through contact holes 581 and 582 and a bypass layer 520 to the data lines 14. The contact hole 581 extends through the first interlayer insulating film 41 and a second interlayer insulating film 42, and the contact hole 582 extends through the first interlayer insulating film 41. The bypass layer 520 is formed on an underlying insulating film 12 as a layer the same as that for the scanning lines 11a. Accordingly, the first conducting layer 511 has a potential the same as that of the data lines 14.

The bypass layer 520 is connected to inspection circuit lines 60a through a contact hole 583. The inspection circuit lines 60a are formed as a layer the same as that for th data lines 14. Each of the inspection circuit lines 60a has one end connected to the inspection circuit 701 shout in FIG. 3, and the inspection circuit 701 includes a plurality of TFTs 702. The TFTs 702 are connected to lines 703 in addition to the inspection circuit lines 60a.

As shown in FIGS. 7 and 8, the dielectric layer 75 is arranged on the first conducting layer 511 and the second conducting layer 512 is formed on the dielectric layer 75 so as to face the first conducting layer 511. The second conducting layer 512 is connected through a contact hole 584 to capacitor-electrode line 503 arranged on the second interlayer insulating film 42.

The capacitor-electrode line 503 extends in a direction which intersects the data lines 14 and is formed as a layer the same as that for the data lines 14. The first conducting layer 511, the capacitor-electrode lines 503, and the inspection circuit lines 60a are formed as the same layer as shown in FIG. 8.

The capacitor-electrode lines 503 are electrically connected to the capacitance lines 400 shown in FIG. 3 to supply the counter electrode potential LCCOM to the counter electrode 21. Thus, a potential of the second conducting layer 512 is kept at the counter electrode potential LCCOM.

Accordingly, when the image signals VID1 to VID12 are supplied to the data lines 14, the electrostatic capacitances of the capacitors are different in accordance with areas in which the first conducting layer 511, the second conducting layer 512, and the dielectric layer 75 are overlapped. Specifically, the electrostatic capacitances of the capacitors C(i)-1 and C(i)-12 having areas of the first conducting layer smaller than those of other capacitors are set to be relatively smaller than electrostatic capacitances of other capacitors C(i)-2 to C(i)-11.

Use of the capacitors C(i)-1 and the C(i)-12 configured as described above can reduce the uneven luminance including stripes displayed along portions of the display corresponding to the data lines at the ends of the i-th data line group and allows display of a high-quality image, as described above. Characteristics which define an electrostatic capacitance including the thickness of the dielectric layer 75 and relative permittivity can be controlled so that the electrostatic capacitances of the capacitors C(i)-1 and C(i)-12 are set to be different from those of the other capacitors.

In this embodiment, a power source used to set the counter electrode 21 to have a constant potential or a power source used to supply a constant potential to the data line driving circuit or the scanning line driving circuit can be used so that the capacitor-electrode line 503 or the second conducting layer 512 has a constant potential. In either case, the capacitor-electrode line 503 and the second conducting layer 512 do not need an additional power source resulting in a simple device configuration.

In addition, the dielectric layer 75 can commonly use the same layer as a dielectric layer included in the retention capacitance 119 in each of the pixel portions 70. Accordingly, each of the capacitors C(i)-k can be configured without a complicated device configuration and can reduce uneven luminance generated in accordance with the difference in image signal potential among the data lines.

Modification

The same advantages as those provided by the embodiment described above can be obtained when no capacitors are provided for the data lines 14(i)-1 and 14(i)-12 but capacitors are provided for the data lines 14(i)-2 to 14(i)-11 and capacitance values of the capacitors can be optimized.

According to the embodiment described above, the capacitors are additionally provided for the corresponding data lines. However, since the data lines themselves and the sampling switches 202 corresponding to the data lines have parasitic capacitances, the same advantages as those provided by the above-described embodiment can be obtained by making use of the parasitic capacitances.

The parasitic capacitance means, for example, a capacitance between a data line and a pixel electrode, a capacitance between a data line and another line or a circuit, or a wiring capacitance of a data line itself.

The data lines positioned at the ends of a block may have different parasitic capacitances from each other. For example, the data lines positioned at the ends of a block may be constituted by finer lines or shorter lines than other data lines so that wiring areas of the data lines are made small to realize small wiring capacitances.

Accordingly, the same advantages as a case where capacitance value of the capacitors additionally arranged for the data lines at the ends of the block are different from those of the other capacitors can be obtained.

Electronic Apparatus

Figure 9:
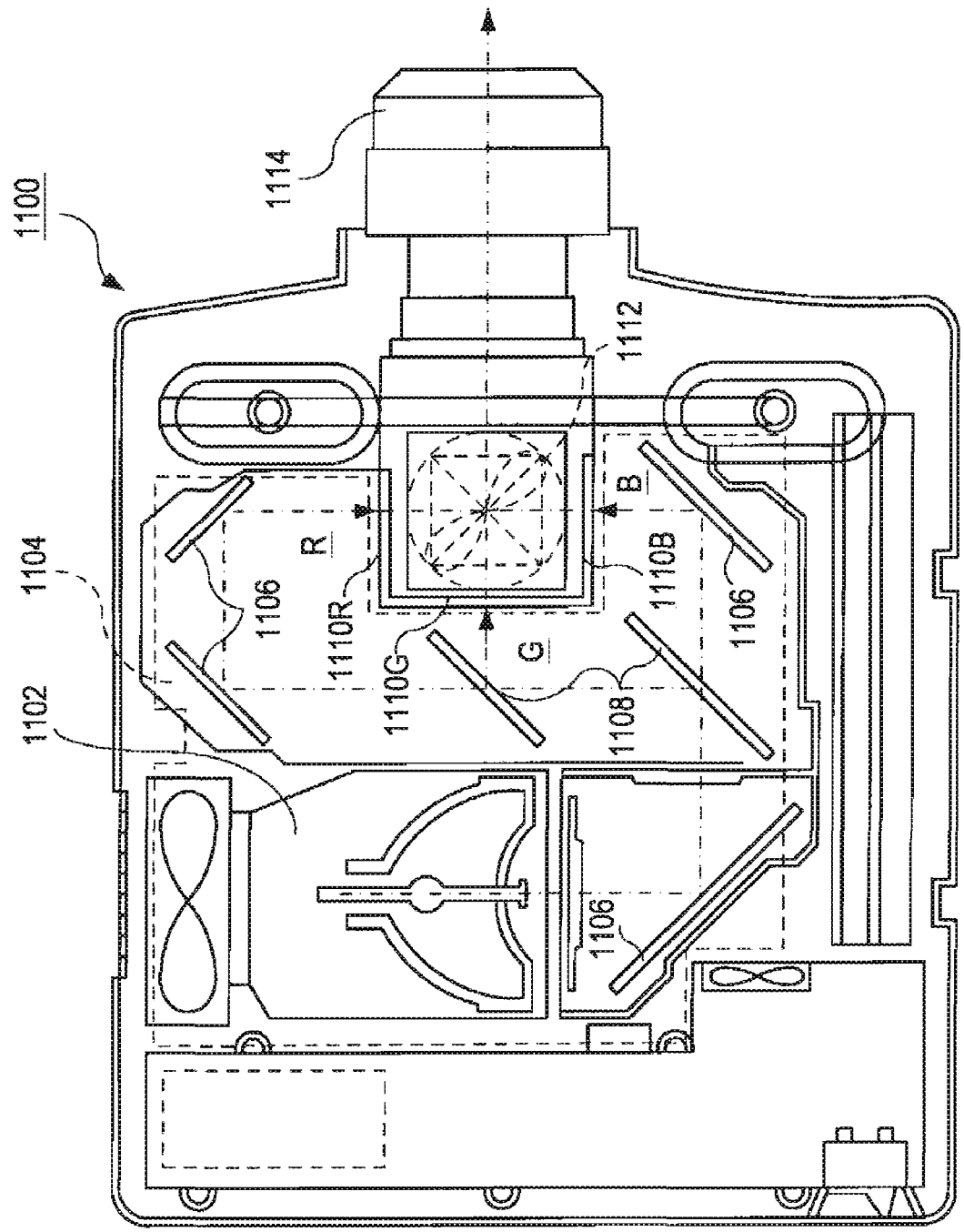
FIG. 9 is a plan view of an electronic apparatus according to the embodiment.

Various electronic apparatuses employing the liquid crystal device described above will now be described. FIG. 9 is a plan view showing a configuration of a projector employing a liquid crystal device as a light valve. As shown in FIG. 9, the projector 1100 includes a lamp unit 1102 having at least a white light source, such as a halogen lamp, therein. Projection light emitted from the lamp unit 1102 is separated into three color components RGB by four mirrors 1106 and two dichroic mirrors 1108 arranged in a light guide 1104 and enters liquid crystal panels 1110R, 1110B, and 1110G used as light valves for the corresponding color components.

The liquid crystal panels 1110R, 1110B, and 1110G have the same configuration as the liquid crystal device 1 described above and are configured so as to be driven by color component signals R, G, and B, respectively, supplied from an image signal processing circuit. Each piece of light, which is modulated by the corresponding liquid crystal panel, enters a dichroic prism 1112 from one of three directions. In the dichroic prism 1112, the light of the R component and the light of the B component are refracted by 90° whereas the light of the G component goes straight. Accordingly, images created by the color components are synthesized and a color image is projected to a screen through a projection lens 1114.

As for the display image created by means of the liquid crystal panels 1110R, 1110B, and 1110G, the image created by the liquid crystal panel 1110G should be a mirror inversed image with respect to the images created by the liquid crystal panels 1110R and 1110B.

Since each of the liquid crystal panels 1110R, 1110B, and 1110G receives light having the corresponding color R, G or B by means of the dichroic mirrors 1108, color filters are not necessary.

Since the projector 1100 having such a configuration includes the above-described liquid crystal device 1, a high-quality image in which stripe uneven luminance is suppressed can be displayed.

The entire disclosure of Japanese Patent Application No. 2006-298559, filed Nov. 2, 2006 is expressly incorporated by reference herein.

What is claimed is:

1. An electro-optical device, comprising:
    a substrate;
    a plurality of scanning lines;
    a plurality of data lines intersecting with the corresponding plurality of scanning lines in pixel areas on the substrate, the plurality of data lines being divided into data line groups, each of which has N data lines of the plurality of data lines, where N is a natural number not less than 2;
    a plurality of pixels arranged in the pixel areas so as to correspond to intersections of the plurality of scanning lines and the plurality of data lines; and
    N image signal lines for supplying N image signals which have been subjected to serial-parallel conversion to the data line groups,
    wherein parasitic capacitances of data lines at the ends of the data line groups being different from parasitic capacitances of data lines other than the data lines at the ends of the data line group.

2. An electro-optical device, comprising:
    a substrate;
    a plurality of scanning lines;
    a plurality of data lines intersecting with the corresponding plurality of scanning lines in pixel areas on the substrate, the plurality of data lines being divided into data line groups, each of which has N data lines of the plurality of data lines, where N is a natural number not less than 2;
    a plurality of pixels arranged in the pixel areas so as to correspond to intersections of the plurality of scanning lines and the plurality of data lines;
    hold capacitors each arranged for a corresponding one of the data lines, the hold capacitors including first hold capacitors and second hold capacitors, the first hold capacitors being arranged for data lines at the ends of each of the data line groups, the second hold capacitors being arranged for data lines other than the data lines at the ends of each of the data line groups; and
    N image signal lines for supplying N image signals which have been subjected to serial-parallel conversion to the data line groups,
    wherein capacitance values of the first hold capacitors is different from capacitance values than the second hold capacitors.

3. The electro-optical device according to claim 1, wherein the capacitance values of the first hold capacitors are relatively smaller than the capacitance values of the second hold capacitors.

4. The electro-optical device according to claim 1,
    wherein the first hold capacitors include a hold capacitor arranged for a data line at a first end of each of the data line groups and a hold capacitor arranged for a data line at a second end of each of the data line groups, and
    wherein the capacitance value of the hold capacitor arranged for the data line at the first end and the capacitance value of the hold capacitor arranged for the data line at the second end are different from each other.

5. The electro-optical device according to claim 1, wherein the capacitance value of the first hold capacitor is set by controlling at least one of: an area in which a pair of conducting layers serving as electrodes of the first hold capacitors and a dielectric layer arranged between the pair of conducting layers are overlapped with each other; a thickness of the dielectric layer; and relative permittivity of the dielectric layer.

6. The electro-optical device according to claim 1, wherein each of the hold capacitors is arranged in a peripheral area of a corresponding one of the pixel areas on the substrate.

7. An electronic apparatus including an electro-optical device set forth in claim 1.

* * * * *